(12) United States Patent
Ishihara et al.

(10) Patent No.: US 12,111,788 B2
(45) Date of Patent: Oct. 8, 2024

(54) CENTRAL PROCESSING UNIT WITH ASYNCHRONOUS REGISTERS

(71) Applicant: UNO Laboratories, Ltd., Tokyo (JP)

(72) Inventors: Hideki Ishihara, Kanagawa (JP); Masami Fukushima, Tokyo (JP); Koichi Kitagishi, Tokyo (JP); Seijin Nakayama, Tokyo (JP)

(73) Assignee: UNO Laboratories, Ltd., Tokyo (JP)

( * ) Notice: Subject to any disclaimer, the term of this patent is extended or adjusted under 35 U.S.C. 154(b) by 131 days.

(21) Appl. No.: 17/432,654

(22) PCT Filed: Feb. 6, 2020

(86) PCT No.: PCT/JP2020/004528
§ 371 (c)(1),
(2) Date: Aug. 20, 2021

(87) PCT Pub. No.: WO2020/175074
PCT Pub. Date: Sep. 3, 2020

(65) Prior Publication Data
US 2022/0197853 A1 Jun. 23, 2022

(30) Foreign Application Priority Data
Feb. 27, 2019 (JP) .................. 2019-033586

(51) Int. Cl.
*G06F 15/78* (2006.01)
*G06F 9/30* (2018.01)
*G06F 9/38* (2018.01)

(52) U.S. Cl.
CPC .......... *G06F 15/78* (2013.01); *G06F 9/30145* (2013.01); *G06F 9/3016* (2013.01); *G06F 9/3802* (2013.01)

(58) Field of Classification Search
None
See application file for complete search history.

(56) References Cited

U.S. PATENT DOCUMENTS

| 4,347,566 A | * | 8/1982 | Koda | ........................ G06F 9/35 712/E9.023 |
|---|---|---|---|---|
| 5,410,661 A | | 4/1995 | Tamura | |

(Continued)

FOREIGN PATENT DOCUMENTS

| JP | H0440525 A | 2/1992 |
|---|---|---|
| JP | H04199331 A | 7/1992 |

(Continued)

OTHER PUBLICATIONS

Machine Translation of JP S6126693 B2 to Fumio et al., 1986. (Year: 1986).*

(Continued)

*Primary Examiner* — Steven G Snyder
(74) *Attorney, Agent, or Firm* — Quarles & Brady LLP

(57) ABSTRACT

A central processing unit which achieves increased processing speed is provided. In a CPU constituted of a RISC architecture, a program counter which indicates an address in an instruction memory and a general-purpose register which is designated as an operand in an instruction to be decoded by an instruction decoder are constituted of asynchronous storage elements.

2 Claims, 5 Drawing Sheets

(56) References Cited

U.S. PATENT DOCUMENTS

| | | | | |
|---|---|---|---|---|
| 5,574,925 | A | * | 11/1996 | Paver ............... G06F 9/30141 |
| | | | | 712/E9.063 |
| 5,638,526 | A | * | 6/1997 | Nakada ............... G06F 9/3824 |
| | | | | 712/E9.046 |
| 5,742,780 | A | | 4/1998 | Caulk, Jr. |
| 5,752,070 | A | * | 5/1998 | Martin ............... G06F 30/35 |
| | | | | 712/E9.063 |
| 6,301,655 | B1 | * | 10/2001 | Manohar ............... G06F 9/3836 |
| | | | | 712/E9.032 |
| 6,496,920 | B1 | * | 12/2002 | Zou ............... G06F 9/3824 |
| | | | | 712/E9.023 |
| 6,658,550 | B2 | * | 12/2003 | Martin ............... G06F 12/0855 |
| | | | | 712/201 |
| 2002/0156995 | A1 | * | 10/2002 | Martin ............... G06F 12/0855 |
| | | | | 712/201 |
| 2011/0022821 | A1 | * | 1/2011 | Fei ............... G06F 9/3822 |
| | | | | 712/32 |

FOREIGN PATENT DOCUMENTS

| | | | | |
|---|---|---|---|---|
| JP | H0721034 | A | | 1/1995 |
| JP | 2002230979 | A | | 8/2002 |
| JP | 2004282477 | A | | 10/2004 |
| JP | 2006309454 | A | | 11/2006 |
| WO | WO-9947999 | A1 | * | 9/1999 ............... G06F 12/04 |

OTHER PUBLICATIONS

'TITAC-2 : An asynchronous 32-bit microprocessor based on Scalable-Delay-Insensitive model' by Takamura et al., IEEE, 1997. (Year: 1997).*

'The Design and Implementation of an Asynchronous Microprocessor' Thesis by Nigel Charles Paver, 1994. (Year: 1994).*

'Design of Asynchronous RISC CPU Register-File Write-Back Queue' by Kim et al., IEEE, 2015. (Year: 2015).*

Machine Translation of Korean Patent Application KR 20120072251 A, 2012. (Year: 2012).*

Machine Translation of Japanese Patent Application JP H05151063 A, 1993. (Year: 1993).*

Is the Instruction Register needed if the Program Counter stores the address of the instruction currently being executed? question from Quora, Kenneth Lerman response marked as 6 years ago, 2017. (Year: 2017).*

"Can a micro operation pass multiple pipeline stages with a single clock cycle?" from Electrical Engineering Stack Exchange, Apr. 2020. (Year: 2020).*

'Lect-pipelining' from Pitt.edu, lectures of Childers, found at https://people.cs.pitt.edu/~childers/CS0447/lectures/lect-pipelining.pdf, 2016. (Year: 2016).*

Japan Patent Office, Final Notice of Reasons for Refusal and translation thereof for application JP2019-033586, dated Jul. 4, 2022, 9 pages.

Furber et al., AMULET2e: An Asynchronous Embedded Controller, In Proceedings Third International Symposium on Advanced Research in Asynchronous Circuits and Systems, IEEE Computer Society, 1997, pp. 290-299.

Nakahodo et al., Design and Implementation to FPGA of MIPS Architecture Asynchronous Processor, The Papers of Technical Meeting on "Information Oriented Industrial System", The Institute of Electrical Engineers of Japan, Technical Meeting on Innovative Industrial System IIS-09-072, 2009, pp. 7-11.

PCT International Search Report and Written Opinion, PCT/JP2020/004528, Mar. 31, 2020, 13 pages.

Japan Patent Office. Notice of Reasons for Refusal for application JP2019-033586. Mailed on Mar. 8, 2022. With translation. 7 pages.

Takamura et al., Performance Enhancement Techniques in Logic Design of Asynchronous Processor TITAC-2, Proceedings of IEICE D-1, 1997, vol. J80-D-I, No. 3, pp. 189-196 with English translation.

Yoshizawa, Realized with the Controller of a Program-Controlled, Driving LCD Character Display Module, Transistor Gijutsu Special, CQ Publishing Co., Ltd., 2002, pp. 89-96 with English translation.

* cited by examiner

CENTRAL PROCESSING UNIT WITH ASYNCHRONOUS REGISTERS

CROSS REFERENCE TO RELATED APPLICATIONS

This application represents the U.S. national stage entry of International Application No. PCT/JP2020/004528 filed Feb. 6, 2020, which claims priority to Japanese Patent Application No. 2019-033586 filed Feb. 27, 2019, the disclosures of which are incorporated herein by reference in their entirety and for all purposes.

TECHNICAL FIELD

The present invention relates to a central processing unit.

BACKGROUND ART

Conventionally, in a central processing unit (also referred to as a microcomputer or microprocessor), execution of one instruction is often performed by dividing it into a plurality of stages in order to increase speed of the instruction execution.

For example, in Patent Document 1, an instruction is executed in five stages: an instruction fetch (IF) stage of fetching an instruction from memory; a decode (DEC) stage of decoding the instruction fetched in the IF stage; an execute (EXE) stage of performing arithmetic/logical operations according to the contents of the instruction decoded in the DEC stage, and performing operations on an address of the instruction to be fetched in the IF stage and an address for accessing memory; a memory access (MA) stage of accessing memory using an operation result in the EXE stage as an address according to the contents of the instruction decoded in the DEC stage; and a write-back (WB) stage of writing operation data or data acquired from the memory to an internal register according to the contents of the instruction decoded in the DEC stage.

CITATION LIST

Patent Document

Patent Document 1: JP 2006-309454 A

SUMMARY OF THE INVENTION

Technical Problem

By dividing the instruction execution into the plurality of stages and executing pipeline processing, the entire processing with several instructions can be shortened in time, and consequently, speed of the instruction execution can be increased. However, it is necessary to take measures against pipeline hazards due to branch instructions and such, causing complication of a circuit and an increase in size of the circuit.

The present invention is made in view of the foregoing and is intended to provide a central processing unit that achieves increased processing speed.

Solution to Problem

In order to solve the problem mentioned above, the present invention according to a first aspect provides a central processing unit constituted of a reduced instruction set computer architecture, including: instruction memory in which program data comprising a plurality of instructions is stored; a program counter configured to indicate an address in the instruction memory; an instruction decoder configured to decode an instruction fetched from the instruction memory; and a general-purpose register capable of being designated as an operand in the instruction to be decoded by the instruction decoder, wherein the program counter and the general-purpose register are constituted of asynchronous storage elements.

The present invention according to a second aspect is the invention according to the first aspect, wherein the instruction fetched from the instruction memory is directly inputted to the instruction decoder.

The present invention according to a third aspect is the invention according to the first or second aspect, wherein the instruction memory is constituted of a synchronous storage element.

Advantageous Effect of the Invention

As described above, according to the present invention, the program counter and the general-purpose register are constituted of the asynchronous storage elements, thus a clock signal is not required when storing data therein, thereby reducing at least the write-back stage. Thus, the number of instruction execution cycles in the CPU 1 can be reduced and the processing speed can be increased.

DESCRIPTION OF EMBODIMENT

Figure 1:
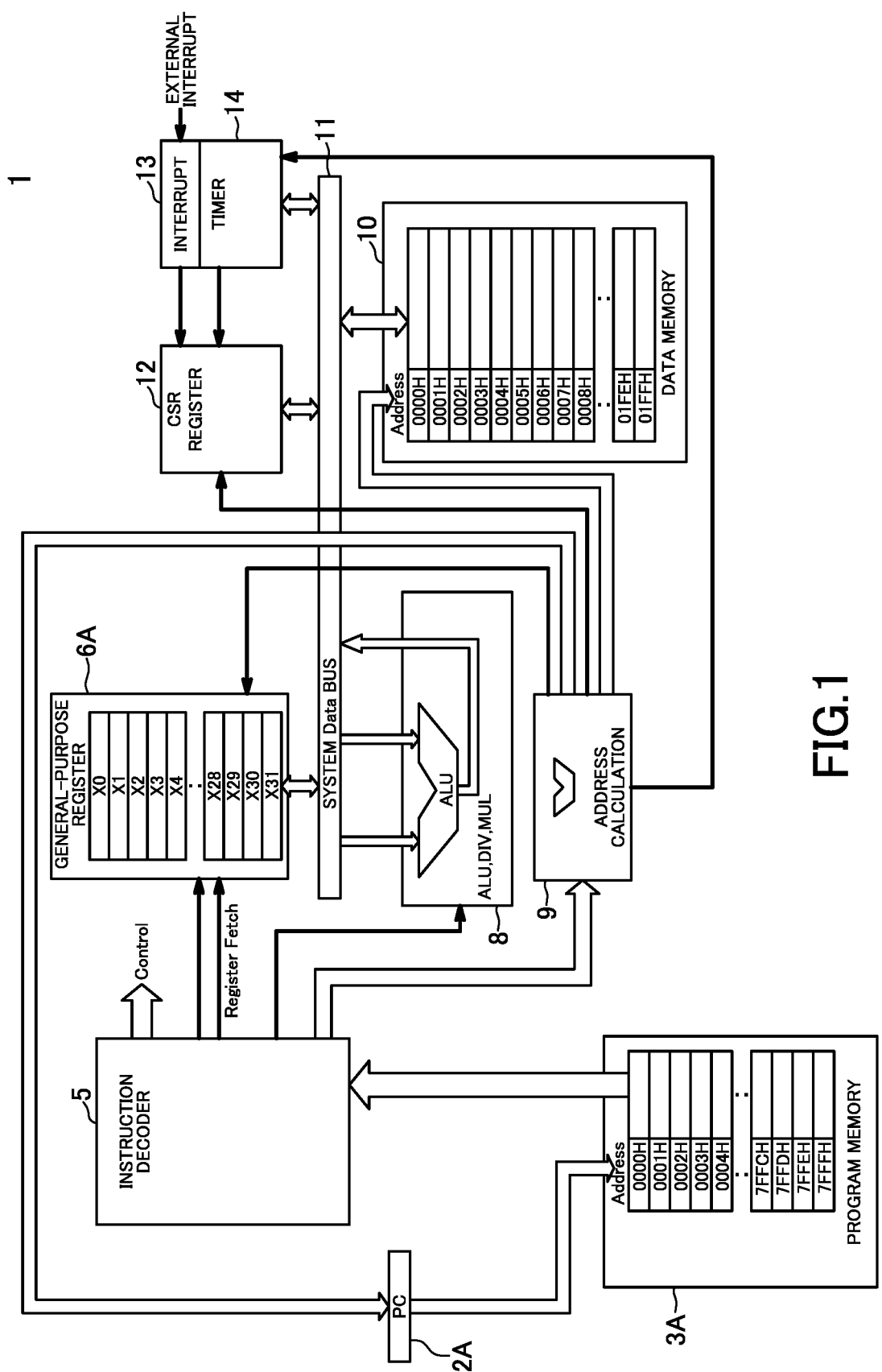
FIG. 1 is a block diagram showing a CPU according to one embodiment of the present invention.

In the following, a central processing unit (also referred to as a microcomputer or microprocessor) of the present invention according to one embodiment of the present invention is described with reference to the drawings. First, a configuration of a conventional central processing unit (CPU) 100 will be described with reference to FIG. 4. The CPU 100 is constituted of a reduced instruction set computer architecture (RISC architecture), and as a specific hardware, it is constituted of a FPGA (Field Programmable Gate Array), for example.

The CPU 100 includes a program counter (PC) 2, program memory 3, an instruction register (IR) 4, an instruction decoder 5, a general-purpose register 6, a data latch 7, an operation unit 8, an address calculation unit 9, data memory 10, a system data bus 11, a CSR register 12, an interrupt control unit 13, and a timer 14.

The PC 2 is a register that indicates (prescribes) an address of an instruction to be fetched from the program memory 3. The PC 2 stores an incremented value or a predetermined address value based on a result at the address calculation unit 9. In this example, the PC 2 is a 16-bit program counter.

In this example, the program memory (instruction memory) 3 is 16-bit data memory having an address space from an address 0000H (hexadecimal) to an address 7FFFH. The program memory 3 stores program data consisting of a plurality of instructions executed by the CPU 100. A stored instruction format may be a fixed length instruction format that is commonly found in the RISC type CPUs, or alternately, program data in a variable length instruction format may be converted into a fixed length instruction format and stored so as to conform with a storage format of the program memory 3.

The IR 4 is a register where an instruction stored in an address indicated by the PC 2 is stored. The instruction stored in the IR 4 is outputted to the instruction decoder 5. The instruction decoder 5 decodes the instruction outputted from the IR 4 and outputs control signals and such as decoded results to the general-purpose register 6, the operation unit 8 and the address calculation unit 9.

The general-purpose register 6 is a 32-bit wide register where data on which operations are performed by the operation unit 8 and by the address calculation unit 9 and operation results are stored, and in this example, it has 32 registers from X0 to X31. The registers X0 to X31 included in the general-purpose register 6 are registers that can be specified as a source operand or a destination operand in an instruction. The data latch 7 is a register that latches data fetched from the general-purpose register 6.

The operation unit 8 includes an arithmetic logic unit (ALU) and a latch for fetching an operation result, and performs various arithmetic operations, logical operations, and the like based on a control signal outputted from the instruction decoder 5. The operation unit 8 may also include a multiplier, a divider and such in addition to the ALU. The address calculation unit 9 calculates an address for accessing the data memory based on the control signal and such outputted from the instruction decoder 5. That is, the operation unit 8 and the address calculation unit 9 function as instruction execution parts for executing the instruction according to the result of the decoding by the instruction decoder 5.

In this example, the data memory 10 is 32-bit data memory having an address space from an address 0000H to an address 01FFH. The data memory 10 is configured such that the result of the operation performed by the operation unit 8 is written thereto based on an address calculated by the address calculation unit 9. Further, data being stored is fetched based on the address calculated by the address calculation unit 9. The fetched data is outputted to the general-purpose register 6 via the system data bus 11. That is, the data memory 10 is configured such that the result of the execution by the instruction execution part is written thereto or data for instruction execution is fetched therefrom.

The system data bus 11 is a data bus connecting the operation unit 8, the general-purpose register 6, the data latch 7, the data memory 10 and such to each other. The CSR register 12 is a register capable of reading status in the CPU 100 or changing settings. The interrupt control unit 13 is configured such that an interrupt request signal (external interrupt) is inputted thereto. Based on the inputted interrupt request signal, the interrupt control unit 13 outputs an interrupt signal to the system data bus 11. The timer 14 outputs an interrupt signal to the system data bus 11 every set period of time.

In the configuration described above, the program memory 3, the general-purpose register 6 and the data memory 10 are constituted of synchronous storage elements, for example synchronous SRAM (Static Random Access Memory) provided in the FPGA device.

In the CPU 100, the IF (instruction fetch) stage is until the instruction fetched from the address in the program memory 3 indicated by the PC 2 is stored in the IR 4, the DE (decode) stage is until data is fetched from the general-purpose register 6 based on the result of the decoding of the instruction stored in the IF 4 by the instruction decoder 5 and said data is stored in the data latch 7, and the EX (execute) stage is until the operation and the calculation and such are performed by the operation unit 8 and the address calculation unit 9 based on the result of the decoding by the instruction decoder 5.

Then, the memory access (MA) stage is until data is fetched from the data memory 10 or data is written thereto based on the address calculated by the address calculation unit 9, and the write-back (WB) stage is until the result of the calculation by the operation unit 8 is written to the general-purpose register 6 and the PC 2 is updated.

Figure 5:
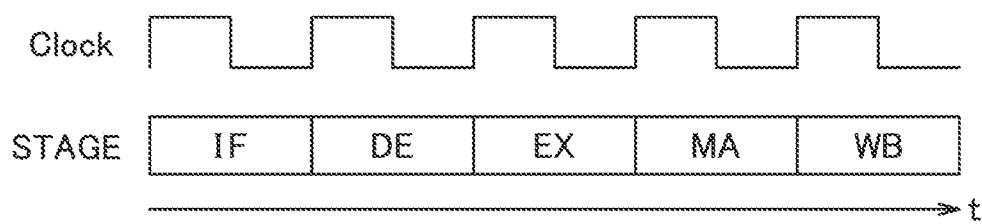
FIG. 5 is a timing chart showing a stage operation during instruction execution by the CPU shown in FIG. 4.

FIG. 5 shows a relationship between each stage and a clock signal. As shown in FIG. 5, since the CPU 100 executes each stage in one cycle, five cycles are required to execute one instruction.

Now, a CPU 1 according to one embodiment of the present invention is shown in FIG. 1. Elements identical to those shown in FIG. 4 are provided with identical reference signs, and explanations thereof are omitted herein.

Figure 4:
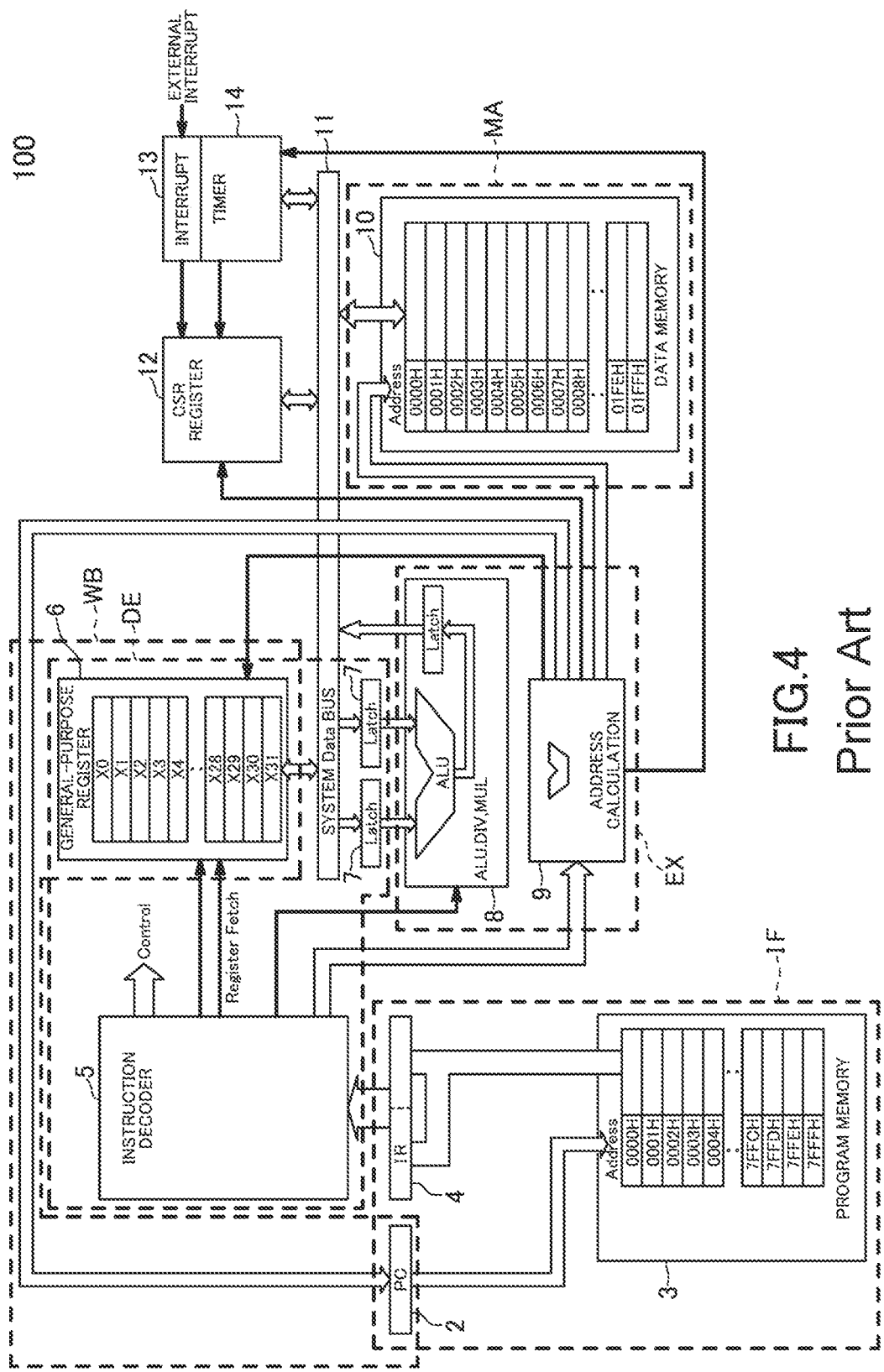
FIG. 4 is a block diagram showing a conventional CPU.

In contrast to FIG. 4, in FIG. 1, firstly, unnecessary registers (such as the data latches 7) are deleted so as to operate the DE stage to the MA stage in one cycle. Secondly, the IR 4 is deleted so as to operate the IF stage to the DE stage in one cycle. In other words, an instruction fetched from a program memory 3A is directly inputted to the instruction decoder 5. That is, the instruction decoder 5 fetches an instruction (program data) directly from the program memory 3A. In the present invention, "directly" means that an instruction is inputted to the instruction decoder 5 without intervention of a circuit synchronized with a clock signal such as the IR 4, as shown in FIG. 1.

By deleting the IR 4, the IF stage is not divided at the IR 4, allowing to operate the IF stage to the MA stage in one cycle.

Further, in the program memory 3A of FIG. 1, program data is stored in advance prior to starting the CPU 1. In other words, after the CPU 1 is powered on and activated, instruction data stored in the program memory 3A can be immediately fetched without accessing an external memory or the like.

Further, a PC 2A and a general-purpose register 6A are constituted of asynchronous storage elements. In this embodiment, they are constituted of RS-flip-flops, for example; however, they may be asynchronous SRAM. This eliminates the need for the PC 2A and the general-purpose register 6A to operate in synchronization with a clock signal, thereby eliminating the need for dividing into the WB stage and allowing to operate the IF stage to the WB stage in one cycle.

Figure 2:
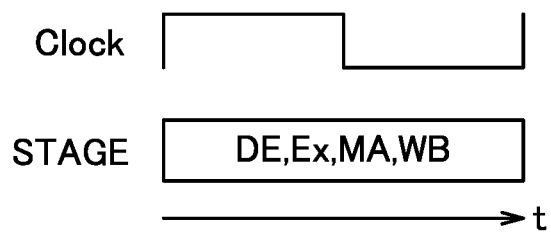
FIG. 2 is a timing chart showing a stage operation during instruction execution by the CPU shown in FIG. 1.

Thus, by configuring as shown in FIG. 1, the CPU 1 can execute one instruction in one cycle as shown in FIG. 2.

According to this embodiment, the CPU 1 constituted of the RISC architecture is configured such that, the PC 2A which indicates the address of the instruction memory 3A and the general-purpose register 6A which is designated as an operand in the instruction decoded by the instruction decoder 5 are constituted of asynchronous memory. By doing so, a clock signal is not required when storing data in the PC 2A and the general-purpose register 6A which correspond to ends of stages, thus the WB stage can be shortened. Thus, the number of instruction execution cycles in the CPU 1 can be reduced, and the speed of the instruction execution can be increased. In particular, as shown in FIG. 1, it is useful when configuring to execute one instruction in one cycle, and by executing one instruction in one cycle, there is no need to use the pipeline processing and there is no need to take measures against pipeline hazards and such.

Further, in the CPU 1, since the instruction fetched from the program memory 3A is directly inputted to the instruction decoder 5, the IR 4 is no longer required, and the IF stage and the DE stage are not divided, thereby reducing the number of instruction execution cycles in the CPU 1.

Further, since the instruction memory and the data memory are constituted of the synchronous storage elements, it is possible to constitute them with memory included in advance in the FPGA. Further, since this memory is constituted of the synchronous storage elements, the entire CPU 1 can be synchronized with the clock signal.

Further, in this embodiment, multiplication operation can also be performed in one clock, thus, multiplication operation using its reciprocal can be used effectively with respect to division which has a drawback that it requires time.

Figure 3:
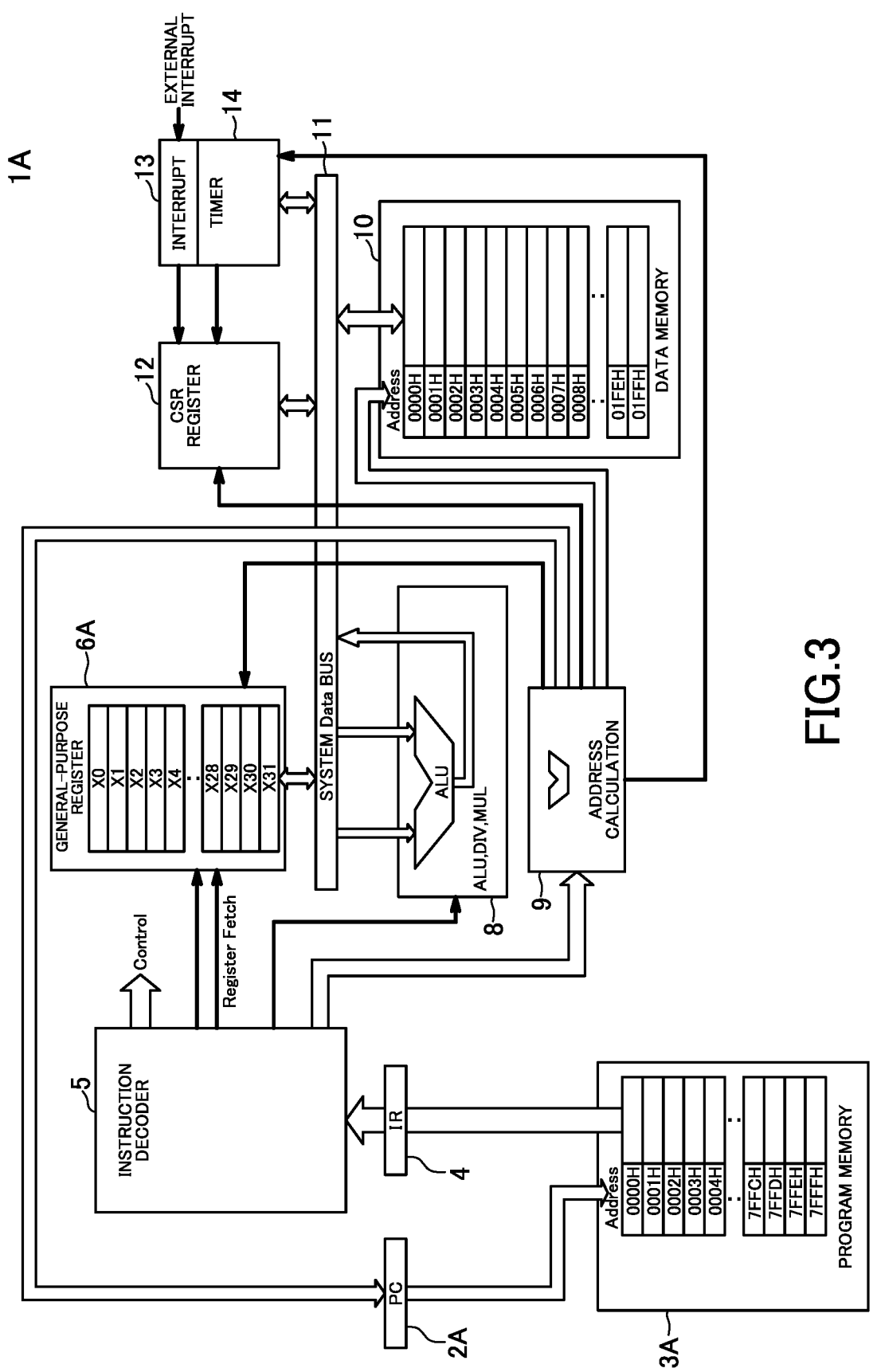
FIG. 3 is a block diagram showing a CPU according to another embodiment of the present invention.

The CPU 1 shown in FIG. 1 is configured such that one instruction is executed in one cycle; however, for example the IR 4 may be arranged between the program memory 3 and the instruction decoder 5 as shown in FIG. 3. In this case, one instruction is executed in two cycles, but the number of cycles required for executing one instruction can be reduced compared to the conventional configuration of FIG. 4.

Although the above-described embodiment has been described on the basis that it is constituted of the FPGA, it may be constituted of an ASIC (Application Specific Integrated Circuit).

The present invention is not limited to the above-described embodiment. That is, those skilled in the art can make various modifications and implement according to conventionally known findings without departing from the gist of the present invention. Such modifications are of course within the scope of the present invention as long as they still include the configuration of the central processing unit of the present invention.

LIST OF REFERENCE SIGNS

1 CPU (Central Processing Unit)
2 A program counter
3 program memory (instruction memory)
5 instruction decoder
6 A general-purpose register
8 operation unit (instruction execution part)
9 address calculation unit (instruction execution part)
10 data memory

What is claimed is:

1. A central processing unit constituted of a reduced instruction set computer architecture, comprising:
    instruction memory in which program data comprising a plurality of instructions is stored and constituted of a synchronous storage element that is synchronized with a clock signal having a predetermined frequency;
    a program counter configured to indicate an address in the instruction memory;
    an instruction decoder configured to decode an instruction fetched from the instruction memory; and
    a general-purpose register capable of being designated as an operand in the instruction to be decoded by the instruction decoder, wherein
    the program counter and the general-purpose register are constituted of asynchronous storage elements such that the clock signal is unnecessary when storing data in the program counter and the general-purpose register,
    the instruction fetched from the instruction memory is a single instruction directly inputted to the instruction decoder,
    the instruction decoder is the only instruction decoder connected to the instruction memory, and
    the single instruction is executed during one cycle of the clock signal, wherein the single instruction includes a decode state, an execute stage, a memory access stage, and a write back stage.

2. The central processing unit according to claim 1, further comprising an operation unit configured to perform an operation based on a control signal output by the instruction decoder, and an operation result by the operation unit is directly input to the general-purpose register.

* * * * *